United States Patent [19]
Schumacher, II et al.

[11] Patent Number: 5,261,216
[45] Date of Patent: Nov. 16, 1993

[54] REAPING PLATFORM FOR HARVESTING MACHINES

[76] Inventors: Gustav Schumacher, II, Gartenstrasse 8; Guenter Schumacher, Raiffeisenstrasse 10, both of D-5231 Eichelhardt, Fed. Rep. of Germany

[21] Appl. No.: 723,937

[22] Filed: Jul. 1, 1991

[30] Foreign Application Priority Data

Jul. 3, 1990 [DE] Fed. Rep. of Germany ....... 4021030

[51] Int. Cl.$^5$ .............................. A01D 57/04
[52] U.S. Cl. ..................... 56/14.4; 56/14.6; 56/16.4; 56/221
[58] Field of Search ............ 56/14.5, 14.6, 16.4, 56/126, 220, 221, 364; 460/16, 20

[56] References Cited

U.S. PATENT DOCUMENTS

| | | | |
|---|---|---|---|
| 3,324,639 | 6/1967 | Halls et al. | 56/14.4 |
| 4,282,703 | 8/1981 | Wilson et al. | 460/16 X |
| 4,300,333 | 11/1981 | Anderson | 56/14.5 |
| 4,539,798 | 9/1985 | Klinner | 56/16.4 |
| 4,800,711 | 1/1989 | Hurlburt et al. | 56/221 X |

*Primary Examiner*—George A. Suchfield
*Attorney, Agent, or Firm*—W. Thad Adams, III

[57] ABSTRACT

The invention concerns a new arrangement of the reaping platform of harvesting machines with a feed drum (2) supported behind the cutter bar (3) in the direction of travel and with, where appropriate, a reel (5) interacting with it, the bearing arrangement of the feed drum (2) being adjustable forwards and backwards in the horizontal direction relative to the cutter bar (3) and, if appropriate, being adjustable so that it can move up and down in the vertical direction relative to the bottom of the reaping platform trough (1).

6 Claims, 4 Drawing Sheets

REAPING PLATFORM FOR HARVESTING MACHINES

BACKGROUND OF THE INVENTION

1. Field of the Invention

The invention concerns a new arrangement for the reaping platform of harvesting machines with a feed drum supported behind the cutter bar in the direction of motion.

2. Discussion of the Background

The feed drum itself can be designed as a worm or else it can be provided with conveyor prongs or strips which transport the crop. It is immaterial whether the drum and reel are used on the reaping platform of a harvesting machine, i.e. on a machine which cuts and processes the crop, or whether they are used in an acceptance unit which accepts and further processes the cut crop or feeds it to units which undertake the further processing.

The invention can also be employed in machines which only cut the crop and deposit it on a windrow for further handling or processing. In order to simplify the presentation, the invention is described within the operational technology of the reaping platform of a combine harvester, as representative of the various harvesting and reaping machines.

Particularly in the case of combine harvesters, the most widely varied crops have, in recent times, been cut by the reaping platform and supplied to the threshing units via the feed drum and the conveyor elements.

The differences between the field crops to be threshed impose very widely varying requirements on the acceptance function of the reaping platform. The feed drum and the reel play a particularly important role in this respect, both in terms of their adjustment relative to one another and in terms of their adjustment relative to the cutter bar of the reaping platform.

Whereas the ability to adjust the reel, both vertically and horizontally, has now become part of the state of the art, ability to adjust the feed drum has been neglected up to now. The known art only provides the drum with a fixed vertical adjustment and for this purpose, the reaping has to be stopped and the work interrupted. In a further embodiment, the drum is rotatably supported by means of a lever in such a way that it can escape upwards against its weight by a small amount if the quantity of straw arriving is large.

In practical operation, however, it often happens that moist straw, in particular, winds around the feed drum and jams the latter so that it can no longer rotate. The newer combine harvesters have a reversing device specially for this case and this permits the drum to be rotated back against the working direction so that the straw which has wound up can be unwound again. In order to rotate against the working direction, however, a jammed drum requires the said torque as that which occurred when it jammed. The overload safety device must therefore be able to transmit a higher torque for rotation against the working direction in order to ensure that the drum can release itself again. This requires complicated overload safety arrangements.

If the drum could be adjusted vertically and horizontally from the driver's seat, it would be substantially easier to turn the drum back because, of course, the jamming takes place because the straw is squeezed between the reaping platform trough and the drum.

The ability to adjust the drum in the horizontal and vertical directions, however, is even more important from a functional point of view. As an example, rape is usually harvested at the same time of the year as other types of grain. Rape, however, is a type of crop particularly subject to ejection. In order to keep this ejection loss as small as possible during combine harvesting, it is necessary to select a distance between the reaping platform cutting bar and the feed drum which is as large as possible so that the rape grains ejected by the rapidly rotating drum are not thrown in front of the reaping platform and thus lost. In addition, rape straw is much bulkier than, for example, grain straw and has to be pushed under the drum by intensive reel work. Particularly in the case of rape, this causes the reel to break open the husks and the grains are lost if they fall in front of the cutter bar.

With other types of crop, the feed operates better if the feed drum is working closer to the cutter bar.

In addition, it frequently happens that the crop is layered in one direction and it is then necessary to operate with a different distance between the cutter bar and the feed drum for the different reaping directions.

The same applies to operations on hilly or sloping terrain.

In order to make the reaping platforms of such harvesting machines universal, various reaping platform extensions are on offer and most of them are fitted for the rape harvest. The cutter bars are then moved approximately 30-40 cm forward relative to the feed drum and the intermediate space is covered by appropriate metal sheets. The fitting of such a reaping platform extension is very expensive in time and labour.

Various other designs include a reaping platform trough which can be extended by lengthening in the forward direction telescopically, either by means of elongated hole slots, hydraulic cylinders or spindles. Since all these designs require the whole of the cutter bar and the cutter drive to be displaced, they are again very expensive, faults and repair work being frequent because of the lack of stability.

SUMMARY OF THE INVENTION

The object of the invention is therefore to produce a reaping platform of the generic type in which the feed drum can be adjusted horizontally and/or vertically in and relative to the reaping platform trough during reaping without the work having to be interrupted.

This object is achieved by making the bearing arrangement for the feed drum adjustable so that it can be moved forwards and backwards relative to the cutter bar or, putting it differently, by making the bearing arrangement of the feed drum in the cutting mechanism trough horizontally adjustable forwards and backwards in the direction of travel.

An advantageous arrangement of the invention consists in adjusting the reel along with the feed drum, at least in the horizontal direction, so that the reel prongs do not collide with the drum when the latter is adjusted forwards.

Such an ability to adjust the feed drum makes it possible to employ the reaping platform in a substantially more universal manner.

The reaping platform trough can then be made intrinsically longer, i.e. with a larger distance between the cutter bar, on the one hand, and the rear-most setting of the feed drum or the rear wall of the reaping platform trough, on the other.

By raising the drum, furthermore, bulky rape straw or large-volume sunflower heads can be introduced more easily under the feed drum without the use of the reel and the danger of the grains being ejected due to the use of the reel can thus be reduced.

In accordance with another advantageous embodiment of the present invention, the reaping platform features a bearing arrangement for the feed drum which is adjustable in such a way that it can be moved up and down relative to the bottom of the reaping platform trough.

Such an arrangement of the feed drum makes the reaping platform substantially more universally usable in association with the harvesting machines explained at the beginning.

In accordance with a particularly preferred embodiment of the invention, the reaping platform for harvesting machines with the feed drum supported behind the cutter bar in the direction of motion features a feed drum bearing arrangement which can be adjusted so that it can be moved forward or backward relative to the cutter bar and up and down relative to the bottom of the reaping platform trough.

The adjustment can preferably take place by means of mechanical and/or electrical and/or pneumatic and/or hydraulic actuation elements and, for the adjustment, it preferably uses the hydraulic system with one or a plurality of hydraulic cylinders, which system is present in any case on combine harvesters and similar harvesting machines. It has proved particularly advantageous to design the adjustment of the feed drum to be remotely controllable from the driver's seat.

In contrast to the previously known machines, fitting work is therefore unnecessary when changing from one type of crop to another.

Although the characterizing features of the present invention could be achieved in various ways, one embodiment has been found particularly advantageous and in this, the feed drum is pivotably supported on a pair of pivoting arms pivotably supported on the reaping platform tough.

The pivoting of the feed drum is then achieved by means of appropriate actuating elements, i.e. electrically, pneumatically or hydraulically actuated screw spindles, servo-cylinders and the like.

Location of the bearing arrangement for the pivoting arms in a vertical elongated hole permits vertical displacement of the feed drum so that the opening between the feed drum and the reaping platform trough is increased.

The pivoting of the pair of pivoting arms then takes place by means of the actuating elements previously mentioned and the bearing arrangement of the pair of pivoting arms in the longitudinal holes can also be displaced vertically by means of such actuating elements. Remote operation can be achieved in a simple manner by means of such actuating elements.

In accordance with a particularly advantageous embodiment, the displacement of the feed drum takes place by means of two linear actuating elements which are hinged on the reaping platform trough at an angle to one another and have a linkage connection to the feed drum in such a way that the latter can take up any desired position by alteration to the length of the actuating elements.

In accordance with another advantageous embodiment, the feed drum is supported in side guide tracks which are located in the side wall of the reaping platform trough and the drum is supported in these guide tracks so that it can be displaced by means of appropriate actuation elements.

These guide tracks are advantageously located horizontally and hence permit a change to the horizontal distance between the cutter bar, on the one hand, and the feed drum, on the other.

In accordance with another advantageous embodiment, the feed drum is supported in vertical guide tracks. In this way, the distance between the feed drum, on the one hand, and the reaping platform trough, on the other, can be matched to the particular requirements in a simple manner by using appropriate actuating elements as the adjustment features.

In addition, one embodiment which is found to be particularly useful has the shaft of the feed drum supported in a curved track attached to the side wall of the reaping platform trough. By means of actuating elements, the particular advantageous setting of the feed drum shaft can then be set on the curved track provided, this advantageous setting giving an optimum position of the feed drum with respect to the cutting bar, on the one hand, and the reaping platform trough, on the other.

In another advantageous embodiment of the present invention, the feed drum is supported on a pivoting arm and is moved up and down by actuating elements, the distance between the cutter bar and the feed drum being also matched to the particular condition as a function of the centre of rotation of the pivoting arm.

From the state of the art considered above, it is already known art to arrange the reel so that it can be displaced forwards and backwards relative to the cutter bar.

In an advantageous arrangement of the present invention, the reel holding device is so connected to the feed drum holding device that when the feed drum is pushed forward, the reel is automatically pushed forward. In this way, a collision between the feed drum, on the one hand, and the reel, on the other, is avoided.

Because both the adjustment of the feed drum and the adjustment of the reel can take place by means of different adjustment mechanisms, numerous design possibilities are available to one skilled in the art and these can be used to achieve the object of the invention, i.e. avoiding a collision between the reel and the feed drum. In accordance with a particularly advantageous arrangement of the present invention, a linkage carrying the reel is hinged on the pivoting arm carrying the bearing arrangement of the feed drum, which linkage carries the reel or its support bushings and adjusts the reel in a manner analogous to the adjustment path of the feed drum.

For the adjustment of the reel, it is fundamentally possible to use, in a similar manner to that used for the adjustment of the feed drum, a hydraulically, pneumatically, electrically or electronically controlled actuation element by means of which an adjustment relative to the adjustment of the feed drum is achieved.

In most cases, vertical adjustment of the feed drum is only necessary in the rearmost position because bulky crops such as rape or sunflower heads, for example, have also to be harvested with the greatest possible distance between the cutter bar and the feed drum. In most cases, therefore, a single hydraulic cylinder or a single pair of synchronized cylinders suffices to move the feed drum forwards and backwards in the horizontal direction and, in its rearmost position, to adjust it upwards and downwards in the vertical direction also. For this purpose, the pivoting frame on which the feed drum is supported, is in turn supported in elongated holes in the side walls of the reaping platform trough in such a way that the pivoting frame can be raised by the amount of the desired vertical adjustment path of the feed drum.

In a further advantageous embodiment with similar support for the pivoting frame, the vertical and horizontal adjustment is effected by means of two hydraulic cylinders or cylinder pairs. The drive for the feed drum can take place in a wide variety of ways. In addition to belt and chain drive, it is also possible to provide the drive by means of hydraulic motors and, given the fact that the hydraulic system is already present, this represents a drive method which is easy to effect and which is, more particularly, compact.

BRIEF DESCRIPTION OF THE DRAWINGS

The invention is now described in more detail using the drawings. In the drawings.

DESCRIPTION OF THE PREFERRED EMBODIMENTS

Figure 1:
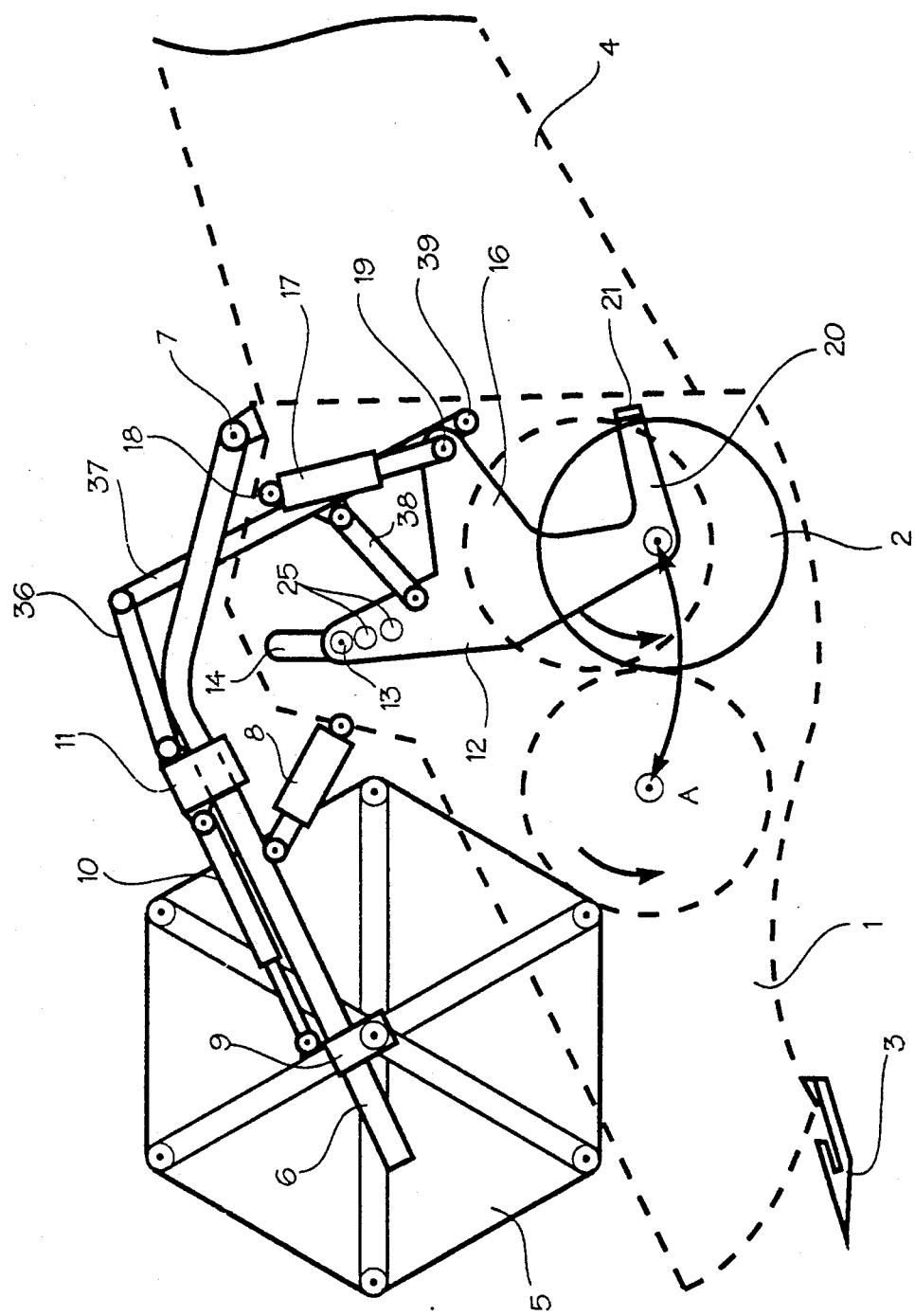
FIG. 1 shows the side view of the reaping platform of a harvesting machine with the illustrative example of the invention which has an adjustment device operating by means of a hydraulic cylinder or of a pair of hydraulic cylinders.

Located in the reaping platform trough 1 is the feed drum 2 which, in most cases, is designed as a drum with worm helices. It rotates anticlockwise in the direction shown.

This drum 2 has the task of funneling sideways the harvested crop cut by the cutter bar 3, usually towards the centre of the reaping platform, and feeding it to the conveyor conduit 4. The harvested crop is guided to the feed drum 2 by the reel 5. In the present state of the art, the reel 5 is rotatably supported on the holding device arm 6 and can be pivotably moved up and down with the holding device arm 6 about the centre of rotation 7. This takes place by means of a hydraulic cylinder 8, or a pair of hydraulic cylinders 8, whose other ends are supported on the reaping platform trough 1. Because the side view shows only one side at a time, the second and symmetrically opposite side wall is included in each part of the description. Holding device arms, bearing arrangement, pivoting levers and actuation elements, such as hydraulic cylinders, for example, are therefore described in pairs in each case, i.e. in the plural.

The reel 5 is rotatably supported on displaceable bushings 9 on the holding device arms 6, the bushings 9 being moved forwards and backwards by means of the hydraulic cylinders 10. In accordance with the invention, these cylinders 10 are also supported on displaceable bushings 11 whose function is described in more detail below.

The feed drum 2 is suspended in the reaping platform trough on two opposite pivoting arms 12 which are supported at 13. The bearing arrangement 13 in the elongated hole 14 is such that the pivoting arms 12, and with them the feed drum 2, can be raised by an amount corresponding to the length of the elongated hole 14. The side arms 16 extending backwards are fastened to the pivoting arms 12 or are designed to be integral with them. The hydraulic cylinders 17, which are supported on the reaping platform trough at 18, act on the side arm 16 at 19. The wiper rail 21 is fastened to the further side arms 20 of the pivoting arm 12.

As shown in FIG. 1, the feed drum 2 is located in its rearmost and lowest position in the reaping platform trough 1. If the drum has to operate closer to the cutter bar 3, the cylinders 17 push out and the drum pivots about the centre of rotation 13 in the direction A. In this motion, it describes an arc with the length of the pivoting arm 12 as radius. The floor of the reaping platform trough preferably has a contour corresponding to this radius so that the gap between the feed drum and the bottom of the trough remains approximately constant over the adjustment path of the drum.

If the cylinders 17 are then retracted, the drum initially pivots back until it reaches its rearmost position. This rearmost position can be fixed by stops or alternatively, it can be determined by the wiper rail 21 because the latter comes into contact with the rear wall of the reaping platform trough.

If the cylinders 17 are now retracted further, the pivoting arms 12 and hence the feed drum 2 are raised. The distance between the bottom of the reaping platform trough and the feed drum can be steplessly adjusted by this means by an amount corresponding to the length of the elongated hole 14.

A higher setting of the feed drum can take place by means of one or a plurality of additional support points 25 should the length of the elongated hole 14 not be sufficient to provide a higher position of the feed drum; in most cases, however, this is unnecessary.

Figure 2:
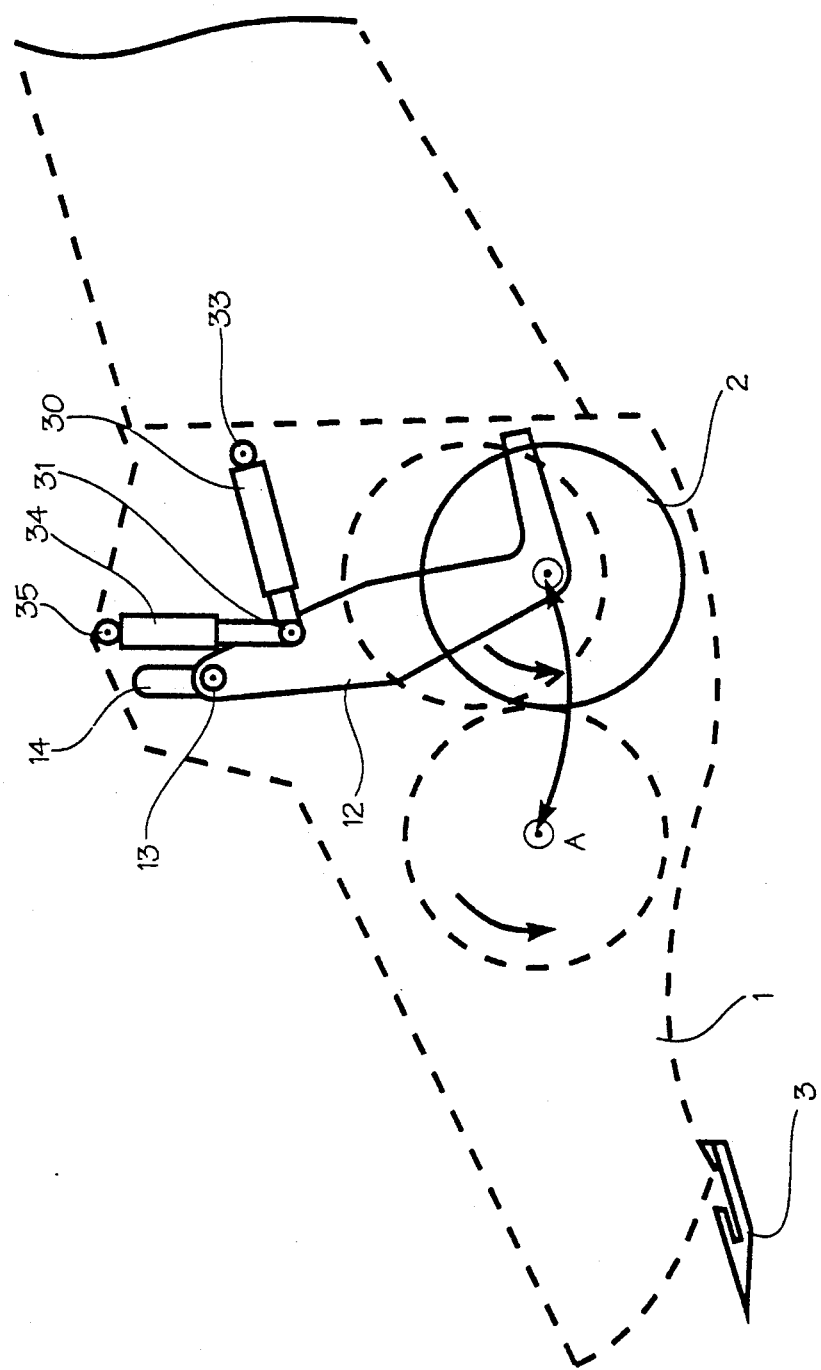
FIG. 2 shows a further illustrative example of the invention with separate horizontal and vertical adjustment.

As already mentioned, in most cases it is only necessary to raise the feed drum in the rearmost position of the drum. If, however, the use of the harvesting machine for further special crops makes a higher position of the drum necessary when it is in the forward position, two differently hinged hydraulic cylinders or two linear servo-elements are used, as shown in FIG. 2, for adjustment in accordance with the invention i.e. one pair of cylinders 34 for the vertical adjustment and one pair of cylinders 30 for the horizontal adjustment of the feed drum 2. In this case, the cylinders 30 are located approximately horizontally and are hinged and supported, at one end, on the pivoting arms 12 at the hinge point 31 and, on the side or the rear wall of the reaping platform trough 1, at 33. A further pair of cylinders 34 for the vertical adjustment of the feed drum 2 is also hinged at 31 to the pivoting arms 12 and, at the other end, to the reaping platform trough approximately at 35. The adjustment path of this pair of cylinders moves the feed drum vertically relative to the bottom of the feeder trough.

The feed drum 2 can be adjusted horizontally and vertically into any desired position by such hinging of the hydraulic cylinders 30 and 34.

The horizontal adjustment of the feed drum 2, however, also causes a motion relative to the reel 5. If, for example, the feed drum 2 is set in the rearmost position and the reel 5 is also set so far rearwards that it operates close to the feed drum 2, the reel setting must be displaced forwards by means of the horizontal adjustment using the hydraulic cylinder 10 before the feed drum 2 is set forwards. Otherwise, the drum 2 will collide with the reel 5. For this reason, the bushing 11 is also moved forwards by the pivoting arm 12 via the linkage 36, 37, 38 when the pivoting arm 12 is moved forwards. The linkage part 37 is supported at a fixed point at 39 but pivotably on the reaping platform trough. The actuating arm 38 pivots the linkage part 37 forwards about the centre of rotation 39 and displaces forwards the linkage arm 36, the bushing 11 and hence also the reel 5. The individual hinge points of the adjustment linkage can be selected in such a way that either an equal or a different displacement path of the reel 5 relative to the displacement path of the feed drum 2 is achieved. The linkage points can also be selected in such a way that the vertical adjustment of the reel 5 and/or the feed drum 2 has no influence or only a slight influence on the horizontal adjustment of the reel and the drum.

The possibilities for simultaneous adjustment of the reel and the feed drum are so numerous that the adjustment described by means of the linkage 36, 37, 38 should be regarded as only one possible illustrative example. Other technical possibilities which achieve simultaneous adjustment of the reel 5 and the feed drum 2 can be used. Electronic controls, hydraulic synchronous components or even electrical linear units are available to one skilled in the art. The same also applies, of course, to all the actuating elements which are only drawn or presented as hydraulic cylinders in the descriptions; these actuating elements could also be designed as hydraulically, pneumatically or electrically actuated screw spindles and the like.

Figure 3:
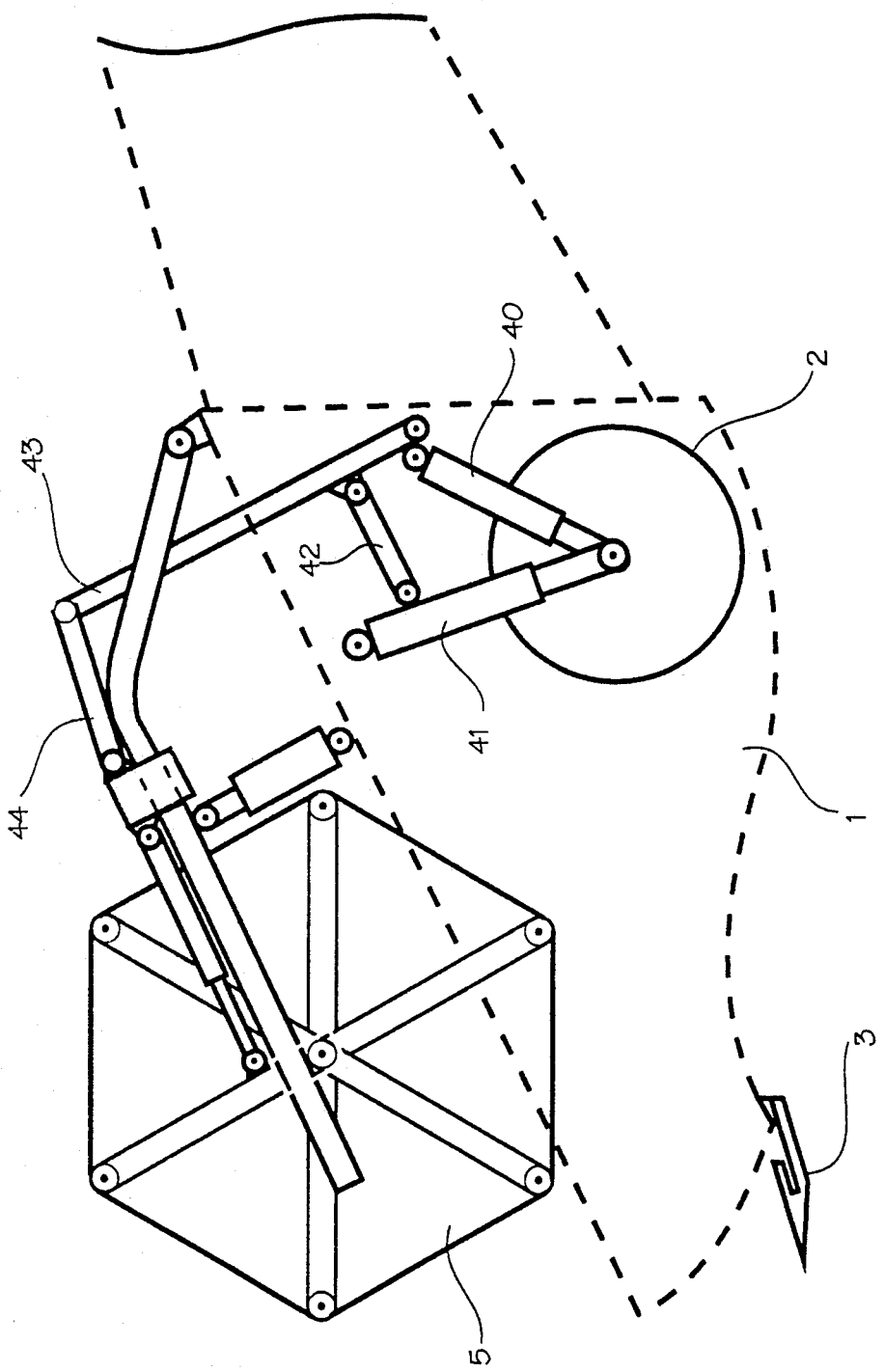
FIG. 3 shows an illustrative example with drum adjustment by means of direct support on two hydraulic cylinder pairs.

FIG. 3 describes an illustrative example in which the shaft of the feed drum 2 is supported on two hydraulic cylinder pairs which are supported at an angle to one another on the reaping platform trough. In this case also, other linear force units, such as electrically driven spindle units, can of course be used in place of the hydraulic cylinders. In this illustrative example, it is again possible (as in the case of FIG. 2) to bring the feed drum 2 into any desired position by vertical and horizontal adjustment, the range of position being determined by the strokes of the hydraulic cylinders 40 and 41.

Figure 4:
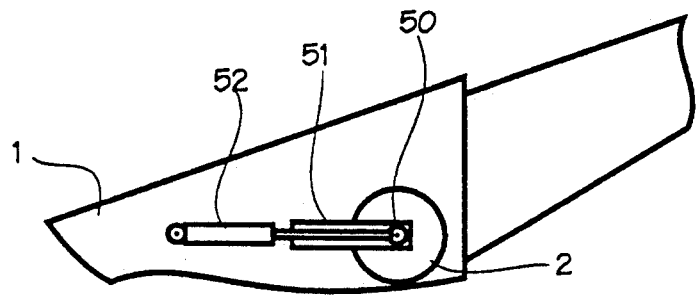
FIG. 4 shows an illustrative example with support of the drum in a horizontal guide track.

In FIG. 4, the shaft 50 of the feed drum 2 is supported in a guide track 51 in the side wall of the reaping platform trough 1 in such a way that it can be adjusted forwards and backwards by means of the hydraulic cylinders 52. The guide track 51 can then be designed to be parallel to the bottom contour of the reaping platform trough but it can also be designed to rise or fall towards the rear and/or the front so that the feed drum 2 can also describe, relative to the bottom of the trough 1, a vertical motion which depends on the horizontal adjustment.

Figure 5:
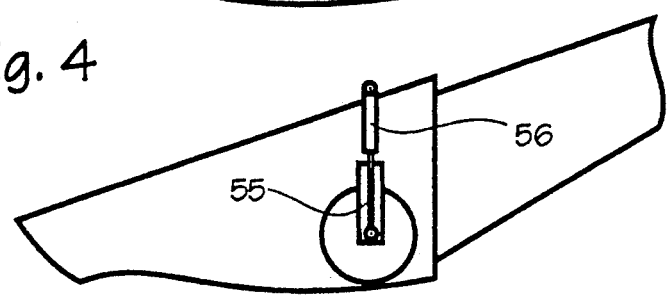
FIG. 5 shows an illustrative example with support of the drum in a vertical guide track.

In FIG. 5, the shaft of the feed drum 2 is supported in a vertical guide track 55 of the reaping platform trough 1 in such a way that it can be adjusted vertically up and down by means of the hydraulic cylinders 56. The vertical adjustment suffices in many cases where very bulky crops are involved.

Figure 6:
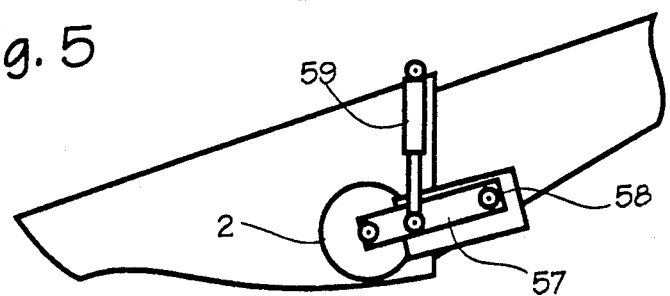
FIG. 6 shows an illustrative example with support of the drum on a pivoting arm.

In FIG. 6, the shaft of the feed drum 2 is supported on pivoting arms 57 which can be pivoted about the centre of rotation 58 on the reaping platform trough 1 by means of hydraulic cylinders 59. The drum 2 therefore moves along an arc with a radius corresponding to the length of the pivoting arm 58 and is thus vertically adjusted. Such a motion can be advantageous, depending on the connection between the reaping platform and the machine. The pivoting arm 57 can, of course, also be hinged forward (not shown) on the reaping platform trough instead of rearward.

Figure 7:
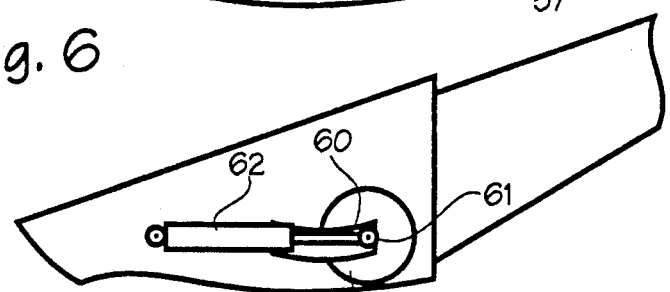
FIG. 7 shows an illustrative example with support of the drum in a curved track.

FIG. 7 shows a curved track guide 60 for the shaft 61 of the feed drum 2. Such an adjustment possibility can also be advantageous when a crop has to be processed which demands a very concave floor contour of the reaping platform trough. The curved track 60 can have the most widely varying contour. The vertical adjustment can then also, of course, exceed the horizontal.

What is claimed as new and desired to be secured by Letters Patent of the U.S. is:

1. A reaping platform for harvesting machines, comprising:
    (a) a feed drum supported on said reaping platform;
    (b) a reaping platform trough supported on said reaping platform;
    (c) a cutting bar positioned on said reaping platform forward of said feed drum;
    (d) one or more mechanical, electrical, pneumatic or hydraulic actuating means for providing forward and backward adjusting movement of the feed drum relative to the cutting bar, and for providing up and down adjusting movement of the feed drum relative to the reaping platform trough; and
    (e) a reel arranged on a holding device which holding device is connected with a holding device of the feed drum in such a way that when the feed drum is moved forward, forward movement of the reel takes place automatically.

2. A reeping platform for harvesting machines according to claim 1, wherein a linkage carrying the reel is hinged to a pivoting arm carrying a bearing arrangement of the feed drum, which linkage carries the reel or its support bushings and adjusts the reel in a manner analogous to an adjustment path of the feed drum.

3. A repeating platform for harvesting machines according to claim 2, wherein the reel is given an adjustment relative to the adjusting movement of the feed drum by means of hydraulically, pneumatically, electrically or electronically controlled actuating elements.

4. A reaping platform for harvesting machines, comprising:
    (a) a feed drum supported on said reaping platform;
    (b) a reaping platform trough supported on said reaping platform;
    (c) a cutting bar positioned on said reaping platform forward of said feed drum; and
    (d) one or more hydraulic cylinders for providing forward and backward adjusting movement of the feed drum relative to the cutting bar, and for providing up and down adjusting movement of the feed drum relative to the reaping platform trough.

5. A reaping platform for harvesting machines, comprising:
    (a) a feed drum positioned on said reaping platform and supported by a horizontal guide track;
    (b) a reaping platform trough supported on said reaping platform;
    (c) a cutting bar positioned on said reaping platform forward of said feed drum; and (d) one or more mechanical, electrical, pneumatic or hydraulic actuating means for providing forward and backward adjusting movement of the feed drum relative to the cutting bar, and for providing up and down adjusting movement of the feed rum relative to the reaping platform trough.

6. A reaping platform for harvesting machines, comprising:
(a) a feed drum supported on said reaping platform;
(b) a reaping platform trough supported on said reaping platform;
(c) a cutting bar positioned on said reaping platform forward of said feed drum; and
(d) one or more mechanical, electrical, pneumatic or hydraulic actuating means for providing forward and backward adjusting movement of the feed drum relative to the cutting bar, and for providing up and down adjusting movement of the feed drum relative to the reaping platform trough; said adjusting movement being remotely controllable from a driver's seat positioned on said harvesting machine.

* * * * *